3,084,142
HALOGENATION OF DEHYDROHALOGENATED
BUTYL RUBBER
Delmer L. Cottle, Highland Park, Theodore Lemiszka, Roselle, and Leon S. Minckler, Jr., Metuchen, N.J., assignors to Esso Research and Engineering Company, a corporation of Delaware
No Drawing. Filed Dec. 19, 1958, Ser. No. 781,449
10 Claims. (Cl. 260—85.3)

The present invention relates to halogen-containing rubbery polymers which rapidly vulcanize at ordinary curing temperatures. Moreover, it concerns a method for preparing such polymers which involves increasing the rubbery polymers' unsaturation and introducing a small, but significant amount of halogen into them.

While low unsaturation rubbery polymers, especially butyl rubber, have been modified to increase their reactivity with curing agents, some difficulty has been encountered in reducing the cure time below 20 minutes at low temperatures, e.g. below 150° C. Fast curing synthetic rubbers are highly desirable in commercial operations wherein time is often a limiting factor. In general, shorter cure times mean greater productivity and lower costs.

It has now been discovered that halogen-containing rubbery polymers may be cured in as little as a few minutes to produce vulcanizates having outstanding physical properties. This is achieved by increasing the rubber's unsaturation with a pyridine-type amine and a halogenating agent, and then halogenating the more highly unsaturated rubbery polymer.

Butyl rubber, a term well known in the rubber art, e.g. Chapter 24 in "Synthetic Rubber," edited by G. Whitby, is a rubbery polymer comprising a major proportion of an isoolefin having 4 to 7 carbon atoms and a minor proportion of a multiolefin having 4 to 8 carbon atoms. The most commonly employed isoolefin is isobutylene, although other isoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 90 to 99.5 wt. percent isoolefin and 0.5 to 10 wt. percent diolefin, which in most instances is isoprene. The polymerization is generally carried out at a low temperature, e.g. between —50 and —165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have a viscosity average molecular weight between about 200,000 and 1,500,000 or more and Wijs iodine number between about 1 and 50.

In carrying out the present invention rubbery polymer, e.g. butyl rubber, is reacted with a halogenating agent and a pyridine-type amine to increase its iodine value about 10-150 units or more (as measured by the Drastic Mercuric Acetate Method) and thereafter reacted with a halogenating agent to form a rubbery polymer containing from about 0.5 to 15 wt. percent of combined halogen.

In one embodiment butyl rubber is carefully halogenated, e.g. brominated, in the presence of about 1 to 20 p.h.r. (parts by weight per hundred parts by weight rubber) of a pyridine-type amine which has a nucleus comprising a six-membered unsaturated ring containing a nitrogen member. The amount of halogenating agent employed is of course dependent upon the particular agent used, as well as the amount of amine compound used in the reaction and the unsaturation of the butyl rubber. Generally, about 2 to 15 p.h.r. of halogenating agent is used, the lower amounts being used when smaller quantities of halogen are desired in the final product. While, on a weight basis, it is usually advantageous to use more amine than halogenating agent, e.g. 10 times the amount of available halogen, it is sometimes desirable to use an excess of halogen. Therefore, for most purposes it is best to maintain a weight relationship in which the amine is present in an amount which is about 0.2 to 5 times the weight of halogen available for halogenation. The reaction, which is essentially a dehydrohalogenation process, may be carried out at any convenient temperature and pressure. Since the reaction will occur at room temperature and lower when brominating agents are employed, the conditions are usually limited only by the equipment and economic factors. However, for most purposes, temperatures of about 0 to 200° C. and pressures of ¼ to 4 atmospheres are quite suitable. Since the dehydrohalogenation reaction readily takes place at temperatures of about 20 to 150° C. and atmospheric pressure, these conditions are preferred. The reaction time is dependent to a large extent on temperature and may vary from as little as 1 to 2 minutes to as much as several hours or more, e.g. 3 hours. It is usually desirable to prepare 5 to 50 wt. percent solution of butyl rubber by dissolving it in an inert liquid organic solvent such as a $C_3$ to $C_{10}$ inert hydrocarbon, e.g. hexane or a halogen-containing solvent, e.g. chlorobenzene, before introducing the reactants. The mixture is then adjusted to the desired temperature and pressure and the reaction carried out for a predetermined length of time, preferably with agitation.

The dehydrohalogenated butyl rubber may then either be precipitated from the solvent by means of a suitable precipitating agent such as an alcohol, ether or ketone, or it may be recovered by distilling the volatile components off by means of steam or hot water in the presence or absence of a slurry aid, such as calcium stearate. If desired, the excess halogen may be removed by washing the rubber solution with a sodium bisulfite solution or any of the common reagents which convert halogen to halide ions. Washing will also remove any unreacted amine in the cement. In any event, the butyl rubber will have an increased iodine number which will be from about 10 to 150 units more than the iodine value of the rubbery polymer starting material. In addition, it will contain a small amount of residual combined halogen. This will usually vary depending upon the reaction conditions from about 0.5 to 3 wt. percent.

The pyridine-type amine compounds which are within the purview of the present invention are those heterocyclic compounds, included in the tertiary amine class, which have the following general formulae:

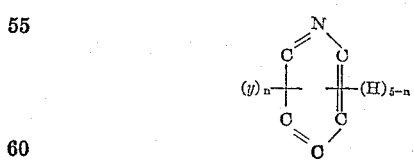

and

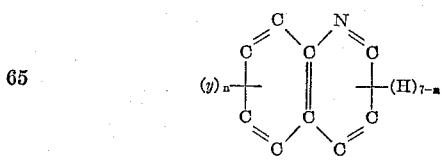

in which "y" is selected from the group consisting of R,

OR and OH; "R" being selected from the group consisting of $C_1$ to $C_{20}$ alkyl, cycloalkyl, aryl, aralkyl and alkaryl; "n" being an integer of between about 0 and 3. In other words, compounds having a pyridine or quinoline nucleus.

Among the heterocyclic tertiary amine compounds which are useful for dehydrohalogenating butyl rubber $\alpha,\alpha'$-dipyridyl, benzylpyridine, ethylmethylpyridine, hydroxyquinoline, dimethylquinoline, methoxyquinoline, $\alpha,\alpha'$dipyridyl, benzylpyridine, ethylmethylpyridine, hydroxypyridine, trimethylpyridine and especially pyridine itself.

Suitable halogenating agents which may be employed in either or both the dehydrohalogenation or halogenation steps include gaseous chlorine, liquid bromine, alkali metal hypochlorites or hypobromites, sulfur chlorides or bromides (particularly oxygenated sulfur chlorides or bromides), pyridinium chloride perchloride, N-bromo-succinimide, iodine monochloride, tri-bromophenol bromide, N-chloroacetamide, N,N'-dimethyl-5,5-dichloro or dibromo hydantoin, and other common halogenating agents.

The halogenation step may be carried out with the aforementioned halogenating agents at above 0° to about 150° C., preferably at about 20° to 80° C. (room temperature being satisfactory), depending upon the particular halogenation agent, for about one minute to several hours, e.g. 3 hours. The halogenating agent may be identical with the one used in the dehydrohalogenation step or it may be different. An advantageous pressure range is from about 0.5 to 400 p.s.i.a.; atmospheric pressure being satisfactory. The halogenation conditions are regulated to incorporate about 0.25 to about 10 wt. percent halogen in the rubbery polymer in addition to any combined halogen already in the polymer or a total of 0.75 to about 13 wt. percent. While the amount of halogenating agent employed may vary from as little as 0.5 p.h.r. to 100 p.h.r., it is generally desirable to employ about 2 to 20 p.h.r.

The halogenation may be accomplished in various ways. One process comprises preparing a 1 to 30 wt. percent solution of the more highly unsaturated copolymer in a suitable inert liquid organic solvent, if desired identical with the solvent used above, such as a $C_3$ to $C_{10}$, or preferably a $C_5$ to $C_8$, inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. and adding thereto gaseous chlorine, liquid bromine, or other halogenating agent, which may optionally be in solution, such as dissolved in any inert hydrocarbon, an alkyl chloride, carbon tetrachloride, etc. The preferred halogenating agents are the elemental halogens, e.g. chlorine.

In order to reduce, and in some cases prevent, any degradation of the rubbery polymer's molecular weight during the halogenation reaction, it is advisable to carry out the second reaction in the presence of about 0.1 to 50 p.h.r. of water. The quantity of water needed depends at least in part upon the efficiency of the agitating means employed to increase the halogenation reaction, less water being required when mixing efficiency is high. Furthermore, it may be desirable in certain instances to use a calcium carbonate slurry in place of the water to avoid any catalytic action on the part of halogen acid which may be formed. Generally, about a 1 to 50 wt. percent calcium carbonate slurry is sufficient to prevent this undesirable action.

The resulting halogenated rubbery polymer may be recovered in various manners. The polymer may be precipitated with acetone, or any other known non-solvent for the rubber polymer, and dried under about 1 to 760 millimeters or higher of mercury pressure absolute at about 0° to 180° C., preferably at about 50 to 150° C. (e.g. 70° C.). Other methods of recovering the halogenated polymer from the solvent are by conventional spray or drum drying techniques. Alternatively, the halogenated highly unsaturated rubbery polymer-containing solution may be injected into a vessel containing agitated water heated to a temperature sufficient to flash off the solvent and form an aqueous slurry of the halogenated highly unsaturated polymer, e.g. butyl rubber. The modified rubbery polymer may then be separated from this slurry by filtration, dried and recovered as a "crumb" or as a dense sheet or slab by conventional milling and/or extruding procedures. The halogenated polymers formed have viscosity average molecular weights between about 100,000 and 1,500,000, iodine numbers of about 12 or 50 to 150 or more and contain at least 0.75 wt. percent combined halogen. The high unsaturation polymers are particularly unique, especially those having an iodine number above 15.

The halogenated highly unsaturated butyl rubber prepared in accordance with the present invention may be compounded with any of the well known materials conventionally added to natural and synthetic rubbers, e.g. butyl rubber. For instance, it may contain any one or more of the following materials in the amounts shown:

| Ingredients: | Parts by weight |
|---|---|
| Halogenated highly unsaturated butyl rubber | 100 |
| Other rubbers (SBR and natural rubber) | 1–100 |
| Fillers (carbon black and siliceous substances) | 25–75 |
| Stearic acid | 1–10 |
| Metal oxides (zinc oxide) | 0.5–20 |
| Pigments (titanium dioxide) | 1–20 |
| Oils (hydrocarbon oils) | 1–30 |
| Curing agents (resins, sulfur, etc.) | 1–20 |
| Accelerators | 0.5–10 |
| Scorch retarders | 0.5–10 |
| Antioxidants (phenyl $\beta$-naphthylamine) | 0.1–5 |

The halogenated highly unsaturated rubbery polymers will rapidly vulcanize in the presence of zinc oxide, quinoid compounds or sulfur donning substances, such as sulfur itself, to produce a vulcanizate having excellent stress strain properties. Suitable accelerators which are especially effective with sulfur-type cures are benezothiazyldisulfide, tetramethylthiuramdisulfide, tellurium diethyldithiocarbamate. The vulcanization may be carried out at temperatures as low as 120° C. or less and as high as 230° C. for times ranging from as little as a few seconds up to an hour. It is preferred to cure the modified butyl rubber at from about 135° to 190° C. for about 1 to 40 minutes; the higher the temperature the shorter the cure time. With a number of curing systems, e.g. sulfur, it is possible to obtain a fully vulcanized polymer in as little as about 2 to 20 minutes at temperatures as low as 130° to 150° C.

The modified polymers of the present invention may be used in a large number of articles including tires, curing bladders, gaskets, V-belts, as well as in such things as wire coatings and rubber springs.

The following examples are given to more fully illustrate the practice of the present invention and in addition to show some of the advantages that may be derived from it.

EXAMPLE 1

An isobutylene-isoprene butyl rubber having 500,000 viscosity average molecular weight and an iodine number (Drastic Mercuric Acetate Method) of 11 was dissolved in hexane to form a 13 wt. percent solution which was then dehydrohalogenated by reacting it with 7.2 p.h.r. of pyridine and 6 p.h.r. of bromine for 5 hours at 68° C. in a glass vessel with agitation. The dehydrobrominated butyl rubber was recovered by precipitating it with methyl ethyl ketone and washing it with water. It was found to contain 2.3 wt. percent combined bromine, have an iodine number of 39 and a viscosity average molecular weight of 310,000. 250 grams of this rubber was then dissolved in 2500 cc. of a $C_6$ hydrocarbon cut which was essentially hexane and treated with 12 p.h.r. of bromine in the presence of 10 p.h.r. of water in a glass vessel with agitaion. At the end of 6 hours the unchanged bromine was removed by adding 3 p.h.r. of cyclohexene and the cement was mixed with one-seventh volume of water and thereafter the rubber was precipitated with methyl ethyl ketone and kneaded in the presence of water until free of halide ion. An analysis of the brominated butyl rubber showed that it contained 4.2 wt. percent combined bromine, an iodine number of 22 and a viscosity average molecular weight of 264,000. A portion of the final product was compounded according to the following recipe and cured at 140°, 152° and 171° C. for 2½ and 15 minutes:

Ingredients: Parts by weight
- Rubber product _____ 100
- SRF carbon black _____ 50
- Stearic acid _____ 0.5
- Zinc oxide _____ 5
- Sulfur _____ 2
- Tellurium diethyldithiocarbamate _____ 1

The physical properties of the vulcanizates obtained are set forth in Table I:

*Table I*

| Properties | 140° C. | | 152° C. | | 171° C. | |
| --- | --- | --- | --- | --- | --- | --- |
| | 2.5′ | 15′ | 2.5′ | 15′ | 2.5′ | 15′ |
| Tensile Strength, p.s.i. | 2,670 | 2,850 | 2,940 | 2,970 | 2,770 | 2,860 |
| Modulus @ 300% Elongation, p.s.i. | 1,610 | 2,270 | 1,970 | 2,140 | 1,870 | 2,350 |
| Elongation, percent | 470 | 390 | 450 | 400 | 420 | 380 | at the same temperatures and times employed above. The physical properties of the vulcanizates are given in Table II:

*Table II*

| Physical Properties | 140° C. | | 152° C. | | 171° C. | |
| --- | --- | --- | --- | --- | --- | --- |
| | 2.5′ | 15′ | 2.5′ | 15′ | 2.5′ | 15′ |
| Tensile Strength, p.s.i. | 1,660 | 1,580 | 1,700 | 1,530 | 1,470 | 1,390 |
| Modulus @ 300% Elongation, p.s.i. | 1,030 | 1,210 | 1,120 | 1,160 | 940 | 930 |
| Elongation, percent | 500 | 430 | 550 | 470 | 550 | 530 |

The above results show that the rubber product of the present invention will rapidly cure in the absence of sulfur or a sulfur donning material to produce a vulcanizate having satisfactory physical properties even at low temperatures and short periods of time.

EXAMPLE 2

The same dehydrobrominated butyl rubber prepared in Example 1 was halogenated with 5 p.h.r. of chlorine in the presence of 10 p.h.r. of water under the following conditions. 250 grams of the dehydrobrominated butyl rubber were dissolved in 2500 cc. of a $C_6$ hydrocarbon cut which was essentially hexane and treated with chlorine in the presence of water with agitation at room temperature in a glass vessel. The chlorine was added over a 52 minute period and thereafter the reaction mixture was permitted to stand for 10 minutes. The entire reaction was carried out at room temperature (25° C.) and atmospheric pressure. The butyl rubber product was analyzed and found to contain 1.05 wt. percent combined chlorine and 2.08 wt. percent combined bromine. It had an iodine number of 19 and a viscosity average molecular weight of about 185,000.

Portions of the butyl rubber product prepared in accordance with the present invention were compounded according to the recipes given in Example 1 and the compounded rubbers were cured at 140°, 152° and 171° C. for 2½ and 15 minutes. The stress-strain properties of the vulcanizates are set forth in Table III:

*Table III*

| Physical Properties | Sulfur Recipe | | | | | | Zinc Oxide (Sulfur-Free) Recipe | | | | | |
| --- | --- | --- | --- | --- | --- | --- | --- | --- | --- | --- | --- | --- |
| | 140° C. | | 152° C. | | 171° C. | | 140° C. | | 152° C. | | 171° C. | |
| | 2.5′ | 15′ | 2.5′ | 15′ | 2.5′ | 15′ | 2.5′ | 15′ | 2.5′ | 15′ | 2.5′ | 15′ |
| Tensile Strength, p.s.i. | 2,070 | 2,480 | 2,300 | 2,580 | 2,370 | -------- | 1,030 | 1,620 | 1,380 | 1,470 | 1,170 | 1,330 |
| Modulus @ 300% Elongation, p.s.i. | 1,150 | 1,560 | 1,420 | 1,470 | 1,620 | -------- | 810 | 1,150 | 800 | 850 | 670 | 1,020 |
| Elongation, percent | 500 | 450 | 490 | 480 | 430 | -------- | 370 | 430 | 470 | 470 | 410 | 400 |

The data in Table I show that the modified butyl rubber was fully cured after only 15 minutes at 140° C. At conventional curing temperatures, e.g. 152° C., it was completely cured at 2½ minutes. This clearly demonstrates the rapidity with which the modified rubbers of the present invention may be vulcanized.

Another portion of the final product obtained above was compounded according to the following recipe:

Ingredients: Parts by weight
- Rubber product _____ 100
- SRF carbon black _____ 50
- Zinc oxide _____ 5
- Stearic acid _____ 1

Portions of the compounded rubber product were cured

The data in Table III show that outstanding vulcanizates may be obtained with the modified rubber of the present invention with various types of curing systems.

Since the dehydrohalogenation step in the present invention may be carried out with greater facility at the lower temperatures with bromine and brominating agents, it is preferred to use these types of reactants in this portion of the process. However, if it is desired to include some combined chlorine in the modified butyl rubber, it may be introduced in a manner similar to that described in Example 2. This type of halogenated, more highly unsaturated butyl rubber has the distinct advantage of containing two different halogens in addition to its high level of unsaturation. These properties render this product particularly suitable for many uses in view of the fact that it has several kinds and number of active areas.

What is claimed is:
1. Process for modifying a rubbery polymer which comprises admixing a low unsaturation isolefin-mutiolefin rubbery polymer with amine having a pyridine nucleus which is characterized by the formula selected from the group consisting of

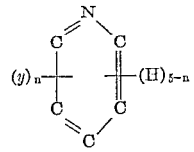

and

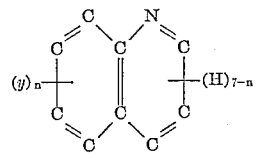

in which "y" is selected from the group consisting of R, OR and OH; "R" being selected from the group consisting of $C_1$ to $C_{20}$ alkyl, cycloalkyl, aryl, aralkyl, and alkaryl; and "n" being an integer of between about 0 and 3, and halogenating agent other than a hydrohalogenating agent at a temperature of about 0 to 200° C. to substantially increase the unsaturation of said polymer while maintaining the halogen content of said polymer less than 3 wt. percent, subsequently admixing the more highly unsaturated polymer with additional halogenating agent at a temperature of 0 to 150° C. to introduce into said polymer about 0.5 to 15 wt. percent combined halogen, and separating from the mixture modified rubbery polymer containing at least 0.75 wt. percent combined halogen and having an iodine number at least 10 units above the iodine number of said low unsaturation rubbery polymer.

2. Process according to claim 1 in which both halogenating agents are the same.

3. Process according to claim 1 in which both halogenating agents are chlorine.

4. Process according to claim 1 in which both halogenating agents are bromine.

5. Process for modifying a low unsaturation rubbery copolymer composed of a major proportion of isobutylene and a minor proportion of multiolefin which comprises admixing a major proportion of said copolymer dissolved in an inert solvent with a minor but sufficient amount of amine having a pyridine nucleus which is characterized by the formula selected from the group consisting of

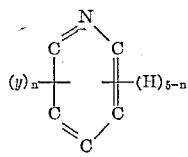

and

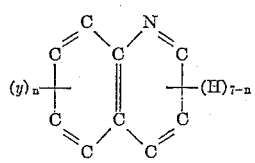

in which "y" is selected from the group consisting of R, OR and OH; "R" being selected from the group consisting of $C_1$ to $C_{20}$ alkyl, cycloalkyl, aryl, aralkyl, and alkaryl; and "n" being an integer of between about 0 and 3, and halogenating agent other than a hydrohalogenating agent at a temperature of 0 to 150° C. to increase the iodine number of said copolymer about 10 to 150 units and introduce at most about 0.5 to 3 wt. percent halogen into said copolymer, subsequently admixing the higher iodine number copolymer formed with sufficient additional halogenating agent at about 0 to 150° C. to introduce an additional 0.25 to 10 wt. percent halogen into the high iodine number copolymer, and separating from the mixture modified rubbery copolymer having an iodine number which is at least 10 units higher above the iodine number of said low unsaturation rubbery copolymer and containing 0.75 to 13 wt. percent combined halogen.

6. Process according to claim 5 in which the amine is pyridine.

7. Process according to claim 5 in which the halogenating agent is bromine and the additional halogenating agent is elemental halogen.

8. A process for modifying a low unsaturation rubbery copolymer composed of a major portion of a $C_4$ to $C_7$ isoolefin and a minor portion of a $C_4$ to $C_8$ multiolefin which comprises, admixing a major proportion of said copolymer dissolved in an inert solvent with a minor, but sufficient, amount of an amine having a pyridine nucleus and bromine at a temperature of 0° C. to 150° C. to increase the iodine number of said copolymer by about 10 to 150 units and introduce about 0.5 to 3 wt. percent bromine into said copolymer, said amine being characterized by the formula selected from the group consisting of

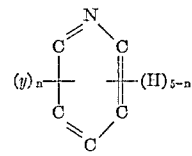

and

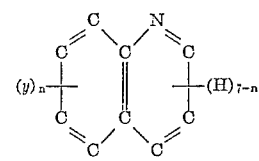

in which "y" is selected from the group consisting of R, OR, and OH; "R" being selected from the group consisting of $C_1$ to $C_{20}$ alkyl, cycloalkyl, aryl, aralkyl and alkaryl; and "n" being an integer of between about 0 and 3, subsequently admixing the thus modified copolymer with a chlorinating agent at about 0° C. to 150° C. to additionally introduce 0.25 to 10 wt. percent chlorine into said copolymer, and recovering a copolymer containing both bromine and chlorine.

9. A process according to claim 5 in which the amine is quinoline.

10. A process according to claim 8 in which the amine is pyridine.

References Cited in the file of this patent
UNITED STATES PATENTS

| | | |
|---|---|---|
| 2,361,072 | Vining | Oct. 24, 1944 |
| 2,596,878 | Veersen | May 13, 1952 |
| 2,631,984 | Crawford | Mar. 17, 1953 |
| 2,732,354 | Morrissey | Jan. 24, 1956 |
| 2,739,141 | Ernst | Mar. 20, 1958 |
| 2,891,595 | Kuntz et al. | June 23, 1959 |
| 2,964,489 | Baldwin | Dec. 13, 1960 |
| 2,995,545 | Cottle | Aug. 8, 1961 |